United States Patent Office 2,728,808
Patented Dec. 27, 1955

2,728,808

STORAGE BATTERY ACTIVE MATERIAL

Julian A. Koerner, New York, and Kenneth B. Meyer, Chappaqua, N. Y., assignors to National Lead Company, New York, N. Y., a corporation of New Jersey No Drawing. Application August 16, 1952,
Serial No. 304,832

4 Claims. (Cl. 136—27)

This invention relates to the manufacture of lead-acid storage batteries. More particularly it relates to a new composition of matter for use as a storage battery active material.

Present methods of preparing the pasted plates of modern storage batteries involve the use as active materials of litharge, water, and either sulfuric acid or lead sulfate. The litharge employed often contains a proportion of finely divided metallic lead which aids in obtaining a stronger plate. The negative plate material usually contains a small proportion of so-called "expander" materials to increase capacity, consisting of blanc fixe, carbon black, and an organic ligneous material.

After assembly of the groups of pasted plates with insulating separators, the cells of modern batteries are conventionally filled with a sulfuric acid of a specific gravity of around 1.100 and the negative sponge lead and positive lead peroxide electrochemically "formed" by applying an electric current. It is more or less universal to employ a forming acid of weaker strength than the final operating acid electrolyte for the well known reason that, while the negative plates will form readily in stronger acid, the positive plates will not readily convert to lead peroxide. The formation efficiency of the positive plates is affected by the concentration of the forming acid. If the concentration of the forming acid is too high it is very difficult to completely and rapidly form the positive plates.

For this reason it is customary to form in weaker gravity acid, dump and refill the cells with stronger gravity acid to obtain a final electrolyte with a specific gravity of around 1.260 or 1.290. It has been attempted to obviate formation in weaker acid and the necessary dumping and refilling operations, by the substitution of a considerable proportion of more costly higher oxides of lead such as red lead in the positive mix, instead of an all litharge plate material, but this practice has not found wide acceptance.

Sulfuric acid is corrosive to equipment and it has been suggested to avoid the use of sulfuric acid in the paste making operation. This may be accomplished by using lead sulfate in the plate material and making a water-mixed paste. Plates made from this material are generally not as strong as those made from the sulfuric acid paste mixes.

The principal object of this invention is to provide an improved storage battery active material. Another object is to provide an active material adapted to paste and battery plate manufacture without the use of sulfuric acid. A further object is to provide an active material adapted to the manufacture of storage battery plates which may be rapidly formed by the electrical formation charge. Another object is to provide an active material adapted to the manufacture of storage battery plates which may be fully formed in a one-fill, one electrolyte process without using higher oxides of lead, such as red lead, in the positive plates. These and other objects of this invention will be apparent from the following description thereof.

Broadly, the invention contemplates a storage battery active material comprising predominantly litharge containing intimately incorporated therein a small proportion of polyvinyl alcohol.

More specifically, the active material of this invention comprises predominantly litharge intimately mixed with about 0.05% to 5% by weight of the active material of polyvinyl alcohol. The active material for positive plates may contain in addition to litharge and the polyvinyl alcohol some finely divided metallic lead, lead sulfate, red lead and lead peroxide. The active material for negative plates may contain in addition to litharge and the polyvinyl alcohol some finely divided metallic lead, lead sulfate and organic expanders. Any litharge suitable for storage battery use may be employed in place of the type litharge used herein.

The manner of incorporating the polyvinyl alcohol is not critical provided it is reasonably well dispersed in the mix. It may be added to the paste or the dry mix, but for the purpose of obtaining better dispersion, it will be found to be preferable to blend it into the dry mix.

To obtain the fullest advantage of the invention in all its aspects, it is intended to make a water mix of the blended dry mix without using sulfuric acid in the paste making operation. This is accomplished by adding a proper proportion of a dry bulking agent such as lead sulfate to the dry mix before the addition of sufficient water to form the paste.

This invention may also be practiced by making a paste of the active material and dilute sulfuric acid and then incorporating the polyvinyl alcohol. Another modification is to make a dry mix of the active materials including the polyvinyl alcohol and then making this into a paste by mixing in dilute sulfuric acid.

The following examples illustrate selected embodiments of this invention. In all of the test and control examples the litharge used was a Barton litharge containing about 30% finely divided metallic lead. The negative pastes used in making the test and control batteries contained the usual expander materials.

The test battery plates were made as indicated, dried and then assembled into battery containers to constitute Standard S. A. E. Group I batteries.

The Standard control batteries were made using the same Barton litharge and expander materials but no polyvinyl alcohol. The plate materials for control batteries were mixed with water and sulfuric acid to make a positive paste of a density about 65 grams per cubic inch and a negative paste of a density about 69 grams per cubic inch. These pastes were pasted into grid structures and dried to make positive and negative plates respectively. The plates were then assembled into battery containers to constitute Standard S. A. E. group I batteries.

The test and control batteries were compared under the same conditions. That is, they were filled with the same strength electrolyte and charged at the same rate for the same length of time. After charging the batteries were disassembled and the plates examined. A visual determination of the amount of positive plate surface area covered with white lead sulfate was taken as an indication of the degree of positive plate formation. A fully formed positive plate will have no lead sulfate visible on its surface.

EXAMPLE I

A dry mix for positive plates weighing 10 pounds, consisting of a litharge containing 30% finely divided metallic lead, 12% lead sulfate and 0.5% polyvinyl alcohol was made. After dry blending for 5 minutes, a paste was made by adding water in the proportion of 78 ml. per pound of dry mix. The ingredients were then mixed for 13 minutes and the result was a cohesive paste with a density of 64.5 grams per cubic inch. This was pasted into battery grids to make positive plates.

A dry mix for negative plates weighing 10 pounds, consisting of litharge containing 30% metallic lead, 12% lead sulfate, 0.5% polyvinyl alcohol and 0.75% of the usual blend of expander materials was prepared. This was dry blended and then made into a paste by adding water in the proportion of 69 ml. per pound of dry mix. The ingredients were mixed for 15 minutes and the result was a cohesive paste with a density of 69 grams per cubic inch. This was pasted into battery grids to make negative plates.

After the plates were dried, they were assembled into battery containers to constitute two Standard S. A. E. group I batteries. The cells of these batteries were filled with sulfuric acid electrolyte of 1.360 specific gravity. These batteries were placed on formation charge at a rate of 15 amperes for 22 hours.

After this charge, one test battery was disassembled. Upon examination, the positive plates were found to be fully forced, as evidenced by the fact that the surface of the positive plates was free of lead sulfate.

In contrast, a control battery without polyvinyl alcohol in its positive or negative plates had the surfaces of its positive plates covered with lead sulfate to the extent of 90% after charging at 15 amperes for 22 hours. This same battery had its positive plates covered to the extent of 50% after 35 hours charge, and to the extent of 30% after 40 hours charge.

Both test batteries having polyvinyl alcohol in the positive and negative plates were tested for performance and life according to the standard S. A. E. tests. The initial capacities were equivalent to those generally obtained by commercial, nominal 100 ampere hour batteries and on life tests they averaged 500 life cycles.

The plates from the test batteries having polyvinyl alcohol were examined for their resistance to cracking and breaking. They were bent in comparison to plates from standard batteries and were found to be stronger and more resistant to cracking.

Generally, two factors greatly retard the formation of the positive plates in a storage battery. These are the use of a high specific gravity formation electrolyte and a high temperature in the battery during formation. The following example illustrates the ability of our plate material to fully and rapidly form positive plates in spite of the inhibiting influences of strong formation acid and high temperatures. This example also illustrates one-fill, one-electrolyte formation which gives a final electrolyte strength suitable for the service life of the battery.

EXAMPLE II

The batteries in this example were made similar to those in the foregoing examples. The positive plates were made using litharge, 0.5% polyvinyl alcohol, 12% lead sulfate and a water mixed paste. The negative plates used were standard negative plates containing no polyvinyl alcohol.

These batteries were filled with different starting electrolytes and charged for 24 hours at a rate of 15 amperes. They were then disassembled and examined. The final specific gravity of the electrolyte was determined. The amount of lead sulfate covering positive plates was determined to indicate the degree of formation.

| Battery | Starting Electrolyte, Sp. Gravity | Percent of Surface Area Covered with Lead Sulfate | Final Electrolyte, Sp. Gravity | Average Formation Temperature, °F. |
|---|---|---|---|---|
| 1 | 1.340 | None | 1.242 | 144 |
| 2 | 1.360 | None | 1.257 | 149 |
| 3 | 1.380 | None | 1.274 | 146 |

The following example illustrates the effect of polyvinyl alcohol when present in different proportions.

EXAMPLE III

Four 5-pound lead oxide positive mixes were made. In addition to the lead oxide these mixes contained:

Mix A.—0.1% polyvinyl alcohol and 12% lead sulfate
Mix B.—0.3% polyvinyl alcohol and 12% lead sulfate
Mix C.—0.5% polyvinyl alcohol and 12% lead sulfate
Mix D.—1.0% polyvinyl alcohol and 12% lead sulfate These mixes were made into pastes by the addition of water, pasted into battery grids and dried to make positive battery plates. Batteries A, B, C, and D were made with the positive plates from the corresponding mixes and with standard negative plates containing no polyvinyl alcohol. The cells were filled with 1.360 sp. gr. acid and the batteries placed on charge at 15 amperes. A standard control battery having no polyvinyl alcohol was compared to the test batteries.

In all cases, visual determination of the amount of positive plate surface area covered with lead sulfate was taken as an indication of the degree of formation in the positive plates. A fully formed positive plate will have no lead sulfate visible on its surface.

*Percentage of Positive Plate Surface Area Covered With Lead Sulfate*

| Formation Time | Standard Control Battery | Test Batteries With Polyvinyl Alcohol | | | |
|---|---|---|---|---|---|
| | | A | B | C | D |
| 18 hours | 95 | 90 | 10 | 10 | 30 |
| 22 hours | 95 | 80 | (*) | (*) | 10 |
| 35 hours | 50 | 10 | | | (*) |
| 40 hours | 30 | (*) | | | |

* No lead sulfate on positive plate surface; indicates complete formation

It will be noted that even with 0.1% polyvinyl alcohol in the positive plate there was a considerable improvement in the positive plate formation, compared to the control.

The following example illustrates that the active material of this invention can be employed to make storage battery plates without using sulfuric acid, lead sulfate or added bulking agents.

EXAMPLE IV

A lead oxide positive mix containing 3% polyvinyl alcohol was made into a paste by the addition of water. The paste density was found to be 64.5. Batteries made with the above plates, along with standard negatives, were filled with 1.360 sp. gr. sulfuric acid and placed on formation charge for 39½ hours at a rate of 15 amperes. The sulfate remaining on the positive plates was not over 10%, while that on the positive plates of a standard control battery was about 75%.

The foregoing examples illustrate the advantages of the storage battery active material of this invention. This active material permits the manufacture of storage battery plates using a non-corrosive water mixed paste. Storage battery plates made using this active material may be rapidly and fully formed in a formation electrolyte of high specific gravity. The rapid formation of the active material of this invention makes possible a one-fill, one-electrolyte formation in the process of battery manufacture. Thus, it is possible to fill the battery cells with a strong electrolyte, form the positive and negative plates and after formation have in the battery an electrolyte of the proper strength for the service life of the battery. The active material of this invention makes battery plates that are sturdier under physical handling, that is, more resistant to cracking and breaking than are conventional battery plates. The plate material of this invention may have added to it any of the conventional additives such as red lead, lead sulfate, sulfuric acid and expander materials.

While the invention has been described and illustrated

We claim:

1. Active material for lead-acid storage battery plates comprising litharge and having intimately incorporated therein, about 0.05% to 5.0% by weight of the active material, of polyvinyl alcohol.

2. Active material for lead-acid storage battery plates comprising litharge and having intimately incorporated therein about 0.5% by weight of the active material of polyvinyl alcohol.

3. Active material for lead-acid storage battery plates comprising litharge and having intimately incorporated therein about 12% by weight of the active material of lead sulfate and about 0.5% by weight of polyvinyl alcohol.

4. In a process for the manufacture of lead-acid storage batteries, the steps which comprise mixing litharge and water into a paste and intimately incorporating therein about 0.05% to 5.0% by weight of the active material of polyvinyl alcohol.

References Cited in the file of this patent

UNITED STATES PATENTS

| | | |
|---|---|---|
| 1,572,512 | Benner | Feb. 9, 1926 |
| 1,572,586 | Weir | Feb. 9, 1926 |

FOREIGN PATENTS

| | | |
|---|---|---|
| 11,532 of 1892 | Great Britain | Apr. 29, 1893 |